United States Patent
Benz

(10) Patent No.: US 9,624,042 B2
(45) Date of Patent: Apr. 18, 2017

(54) DEVICE AND METHOD FOR PACKAGING TUBES

(71) Applicant: Texa AG

(72) Inventor: Gottlieb Benz, Flums (CH)

(73) Assignee: Texa AG, Haldenstein (CH)

( * ) Notice: Subject to any disclaimer, the term of this patent is extended or adjusted under 35 U.S.C. 154(b) by 0 days.

(21) Appl. No.: 14/743,929

(22) Filed: Jun. 18, 2015

(65) Prior Publication Data

US 2015/0368048 A1    Dec. 24, 2015

(30) Foreign Application Priority Data

Jun. 19, 2014  (CH) .......................................... 936/14

(51) Int. Cl.
| | | |
|---|---|---|
| *B65G 47/52* | (2006.01) | |
| *B65G 47/34* | (2006.01) | |
| *B65G 47/71* | (2006.01) | |
| *B65G 47/82* | (2006.01) | |
| *B65B 35/30* | (2006.01) | |
| *B65B 35/44* | (2006.01) | |

(52) U.S. Cl.
CPC ............. *B65G 47/52* (2013.01); *B65G 47/34* (2013.01); *B65G 47/71* (2013.01); *B65G 47/82* (2013.01)

(58) Field of Classification Search
None
See application file for complete search history.

(56) References Cited

U.S. PATENT DOCUMENTS

| | | | |
|---|---|---|---|
| 3,791,518 A * | 2/1974 | Vanderhoof | ............ B07C 5/362 |
| | | | 198/364 |
| 4,180,154 A | 12/1979 | Andersson | |
| 5,339,606 A | 8/1994 | Benz | |
| 5,611,193 A * | 3/1997 | Farrelly | ................. B65B 5/105 |
| | | | 53/245 |
| 5,704,195 A | 1/1998 | Benz | |
| 7,308,779 B2 | 12/2007 | Benz | |

FOREIGN PATENT DOCUMENTS

| | | |
|---|---|---|
| CH | 682385 A5 | 9/1993 |
| DE | 2200390 | 7/1973 |
| EP | 0350910 A2 | 1/1990 |
| EP | 1114784 A1 | 7/2001 |

* cited by examiner

*Primary Examiner* — Kavel Singh
(74) *Attorney, Agent, or Firm* — Bachman & LaPointe, PC

(57) ABSTRACT

In a device for supplying elongated, at least approximately hollow cylindrical, product units, preferably tubes, cartridges or cans, to packaging units, the device comprises means to distribute a continuous stream of product units to two packaging units that operate in parallel. In a method for supplying elongated, at least approximately hollow cylindrical, product units, preferably tubes, cartridges or cans to packaging units, a continuous stream of product units is distributed, by means of a distribution device, to two packaging units that operate in parallel.

12 Claims, 8 Drawing Sheets

DEVICE AND METHOD FOR PACKAGING TUBES

REFERENCE TO RELATED APPLICATIONS

This application claims priority to Swiss patent application no. CH-00936/14, filed Jun. 19, 2014.

TECHNICAL FIELD

The present invention relates to a method and to a device for packaging elongated, at least approximately hollow, cylindrical product units, preferably tubes, cartridges or cans, that continuously arrive from a production line and, by means of a grouping device, are arranged in product groups of a predeterminable number of product units situated side by side that correspond to a layer or row of product units to be placed in a box.

BACKGROUND

Methods and devices that are used to group product units into product groups and to package them into boxes are known in many embodiments. The method-related procedure and a corresponding device to implement such a method in each case strongly depend on the type of product units.

Thus, for example, U.S. Pat. No. 5,732,536 shows a device by means of which adhesive tape can be packaged in boxes; the German published patent specification, examined only as to obvious defects but not as to patentability, DE2200390 shows a device for packaging, for example, household paper rolls; or EP350910 shows a device for packaging flower pots. The handling of different types of products requires correspondingly different methods and devices, and even in products that are apparently of the same type, depending on their size or design, different problems may occur which correspondingly also require differently matched methods and devices.

The present invention relates to a device and a method for packaging elongated, at least approximately hollow cylindrical, product units, preferably tubes, cartridges or cans, as known, for example, from EP1114784. This device is used per se, in particular, to form groups of elongated cylindrical product units that continuously arrive from a product line. The product groups formed are moved on a moving conveyor belt to a removal position from where they are pushed, layer by layer, into a box.

In a method known from CH682385, a compensator is interposed between a continuous supply and a discontinuous delivery, which compensator continuously receives the continuously supplied products and delivers them discontinuously. This takes place by way of a loop of a closed chain, which can be lengthened or shortened, which loop extends between an interposed receiving position and a delivery position.

From FR2391126 a device is known for grouping cylindrical product units that continuously arrive from a product line, and for conveying them in groups to a delivery position. In this design the conveyance and grouping devices comprise two transport slides that can move one behind the other and that are controlled in such a manner that one of them is loaded, while the other one moves to the delivery station where it is emptied. The emptied transport slide can then be moved back to the loading station, while the loaded station moves back to the delivery station. During the period of time in which no product units can be placed into the conveyance and grouping device, said product units are held back by a sluice flap.

A device according to EP0594917 operates in a similar manner. In this design, too, the conveyance and grouping device operates with two independently controlled transport slides, wherein, however, a conveyance device is arranged between the production line and the device for grouping the production units. Furthermore, the device comprises a shared transfer path in which the conveyance unit and the conveyor belt with the transport slides extend parallel to each other at some distance. In contrast to the arrangement with the previously described device, transfer to the conveying and grouping device takes place continuously and always in the same location.

In the device known from EP0774414 operation is by means of suction units that can be freely activated. Accordingly, it is extremely simple to remove product groups comprising different numbers of product units. Furthermore, the suction units can be accommodated in a gripper in which the grippers, matching the diameter of the product units, can be spaced apart from each other as required. On a delivery table that operates in a bellows-like manner, said grippers can be moved together to the diameter distance and can then be slid over into the corresponding shape. This device that operates with compressed air is, in particular, suited to production lines that operate at relatively low performance, wherein, however, changing the production line to different product units takes place relatively frequently. Since practically no conversion is required, in such cases the device pays off despite its expensive design. However, in the case of devices of the type mentioned in the introduction, where the production line is not frequently changed, such a device does not pay off because it operates too slowly.

WO2005019035 describes a device in which the product units are supplied on a conveyor belt comprising product receiving devices. When a predetermined number of product units are in the correct position the conveyor belt is stopped, and the product units are pushed, by means of a slider, onto a mandrel support. In this manner several rows of the product units are consecutively grouped to form a product group. This method is associated with a disadvantage in that each time during the transfer of the product units the conveyor belt needs to be stopped. Furthermore, a further row of product units can only be supplied after the slider has moved back. This has a significant negative effect on the overall processing speed of the grouping device and thus on the packaging costs.

In the machines present in today's market the tubes are either slid layer by layer into a corresponding box, or, as described in WO2005019035, are slid layer by layer for intermediate storage onto a plate-shaped mandrel support. The maximum throughput rates of conventional packaging devices range from 200 to 300 tubes per minute.

SUMMARY

It is an object of the invention to provide a device and a method by means of which the packaging speed of elongated, at least approximately hollow cylindrical, product units, preferably tubes, cartridges or cans, can be significantly increased when compared to the known devices and methods.

This is achieved with a device comprising a conveyor belt for the continuous conveyance of several product units in a direction of conveyance, and means for distributing in order to distribute the continuous stream of product units to two packaging units that operate in parallel, wherein the means for distributing comprise a distribution device with a two-part distributor plate for accommodating a selectable number of product units from the conveyor belt, which distributor plate for accommodating the selectable number of product units can be moved parallel to the direction of conveyance of the conveyor belt and synchronously with the operating speed of the conveyor belt, wherein the distributor plate can be divided into two distributor plate halves that are movable in such a manner that they can convey half of the product units accommodated by the distributor plate to the respective packaging units.

The present invention further provides a method for supplying elongated, at least approximately hollow cylindrical, product units, preferably tubes, cartridges or cans, to packaging units in that a continuous stream of product units is distributed, by means of a distribution device, to two packaging units that operate in parallel, the method comprising the following steps:

a) providing a continuous conveyance stream of several product units in a direction of conveyance on a conveyor belt;
b) transferring a selectable number of product units from the conveyor belt to a distributor plate that can be divided into a first distributor plate half and a second distributor plate half wherein the distributor plate moves synchronously with the conveyor belt in the direction of conveyance;
c) dividing the distributor plate into the first and the second distributor plate halves, wherein each of the two distributor plate halves conveys half of the transferred product units to a first grouping device or to a second grouping device;
d) transferring the product units from the two distributor plate halves to the grouping device; and
e) returning the distributor plate halves for the renewed carrying out of the steps b) to d).

By means of the device according to the invention and the method according to the invention the maximum throughput rates can be double to more than 500 tubes per minute, in that the stream of product units emanating from the production line is divided into two streams and is distributed to two packaging units or to the respective grouping device of two packaging units. As a rule, the means comprise a distribution device with a two-part distributor plate.

In one embodiment the device for supplying elongated, at least approximately hollow cylindrical, product units, preferably tubes, cartridges or cans, for two packaging units comprises a conveyor belt for the continuous conveyance of several product units in a direction of conveyance, and a first and a second grouping device of a packaging unit by means of which a selectable number of product units can be grouped layer by layer to product groups that can be placed into one or two boxes. Furthermore, the device comprises a distribution device that comprises a two-part distributor plate for accommodating a selectable number of product units from the conveyor belt. The distributor plate for accommodating the selectable number of product units can be moved parallel to the direction of conveyance of the conveyor belt and synchronously with the operating speed of the conveyor belt. The distributor plate can be divided into two distributor plate halves that are movable in such a manner that they can convey half of the product units accommodated by the distributor plate to the first grouping device and half to the second grouping device.

In the device and the method for grouping continuously supplied product units to form product groups, the product units are conveyed, without a gap, on the conveyor belt in a conveyor stream in the direction of conveyance. The distribution device divides one conveyance stream into two conveyance streams, thus supplying product units to two grouping devices. Furthermore, the distribution device comprises a distributor plate that can be divided into two distributor plate halves, each, with the conveyor belt running, accepting a selectable number of product units, and being able to supply half of the accepted product units to one of the two grouping devices. In this manner the packaging speed can be significantly increased in that firstly it is not necessary to stop the continuous supply during acceptance of the product units, and secondly two grouping devices can simultaneously be supplied with product units.

In one embodiment the distribution device can further comprise a slider that can be moved synchronously with the distributor plate in the direction of conveyance, and in relation to the distributor plate is arranged on the opposite side of the conveyor belt so that by means of the slider the selectable number of product units, preferably with the conveyor belt running, and across the direction of conveyance, can be slid from the conveyor belt to the distributor plate.

In one embodiment, for the purpose of transferring the product units from the respective distributor plate halves to the first or to the second grouping device, the device for packaging can comprise a first distribution slider and a second distribution slider by means of which the product units arranged on the first or on the second distributor plate half can be transferred to a first or to a second grouping plate of the first or of the second grouping device. In this arrangement the first distribution slider and the second distribution slider can be arranged above the conveyor belt.

In all the embodiments the first distributor plate half and the second distributor plate half can in addition be movable upwards or downwards perpendicularly to the direction of conveyance of the conveyor belt, which makes it possible to achieve a smaller design size of the entire device. This vertical displacement is associated with an advantage in particular in that with the use of first and second distribution sliders arranged above the conveyor belt the two distributor halves can be moved downwards and back into the acceptance position already during the return movement of the distribution sliders. In this way the packaging speed can be further increased.

In all the exemplary embodiments the first and the second grouping plates can be movable, perpendicularly to the direction of conveyance of the conveyor belt, upwards and downwards and parallel to the direction of transport of the conveyor belt in order to group the product units, to form product groups, into a provided box or onto a mandrel plate. The vertical slidability makes it possible to distribute the product groups to individual layers, and the horizontal slidability makes it possible to offset the individual layers relative to each other for optimum packaging.

The method for packaging elongated, at least approximately hollow cylindrical, product units, preferably tubes, cartridges or cans, comprises the following steps: a) providing a continuous conveyance stream of several product units in a direction of conveyance on a conveyor belt; b) transferring a selectable number of product units from the conveyor belt to a distributor plate that can be divided into a first distributor plate half and a second distributor plate half; c) dividing the distributor plate into the first and the second distributor plate halves, wherein each of the two distributor plate halves conveys half of the transferred product units to a first grouping device or to a second grouping device; d)

transferring the product units from the two distributor plate halves to the grouping device; and e) returning the distributor plate halves for the renewed carrying out of the steps b) to e).

Preferably, in step a) each product unit on the conveyor belt is placed in a respective product receiving device. The transfer in step b) can be carried out with the conveyor belt running, in that the product units on the conveyor belt, which product units are to be transferred, and the distributor plate move along a shared transfer path. As a rule, during step b) the foremost product receiving device, in the direction of conveyance, of the distributor plate is in agreement with the product receiving device of the foremost product unit on the conveyor belt. For transfer in step b) a slider can be used that moves in the direction of transport synchronously with the distributor plate.

BRIEF DESCRIPTION OF THE FIGURES

The invention is explained in more detail below with reference to exemplary embodiments in conjunction with the drawings, in which.

DETAILED DESCRIPTION

Figure 1:
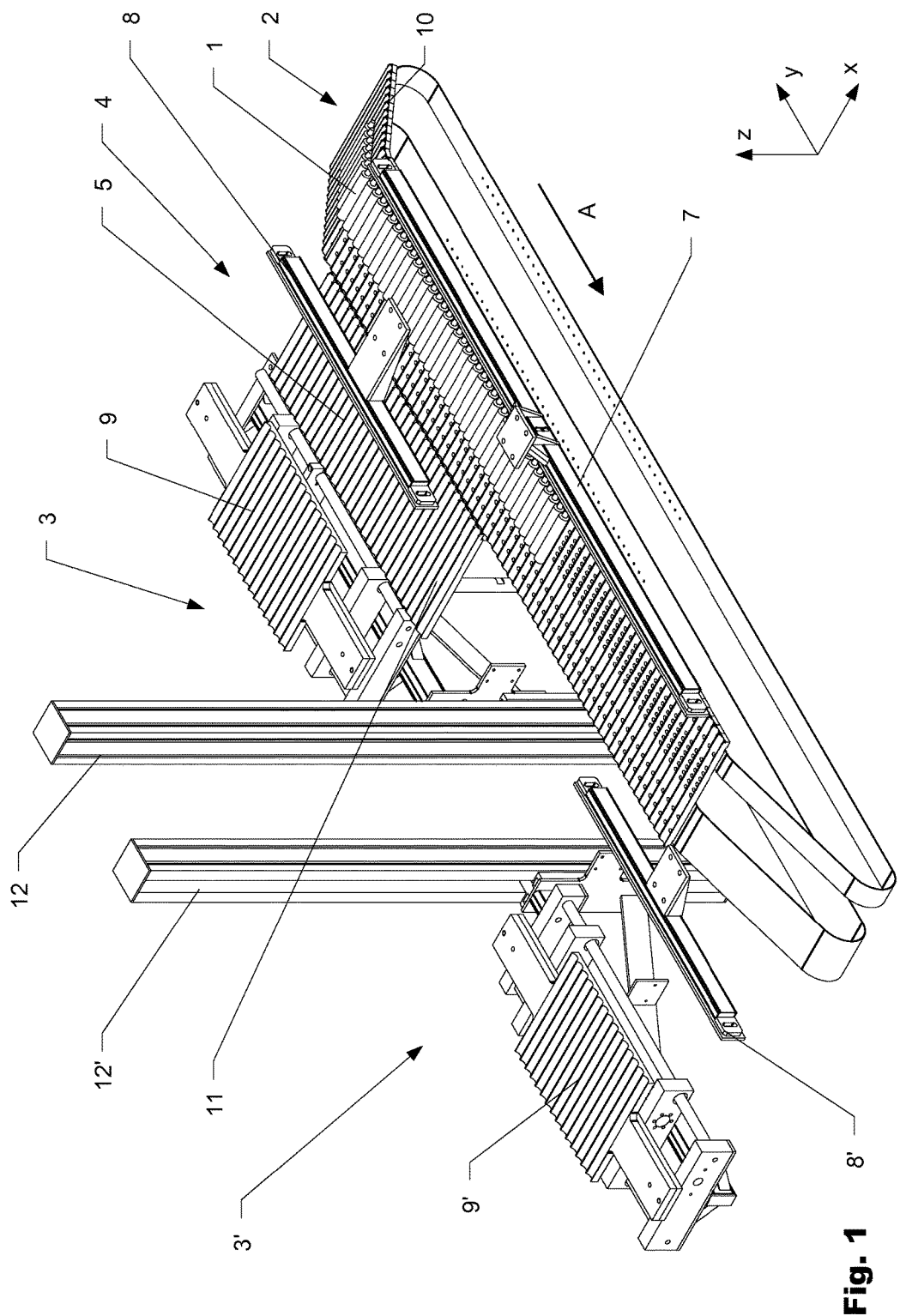
FIG. 1 shows a perspective view of a device for packaging tubes with a distribution device.
Figure 2:
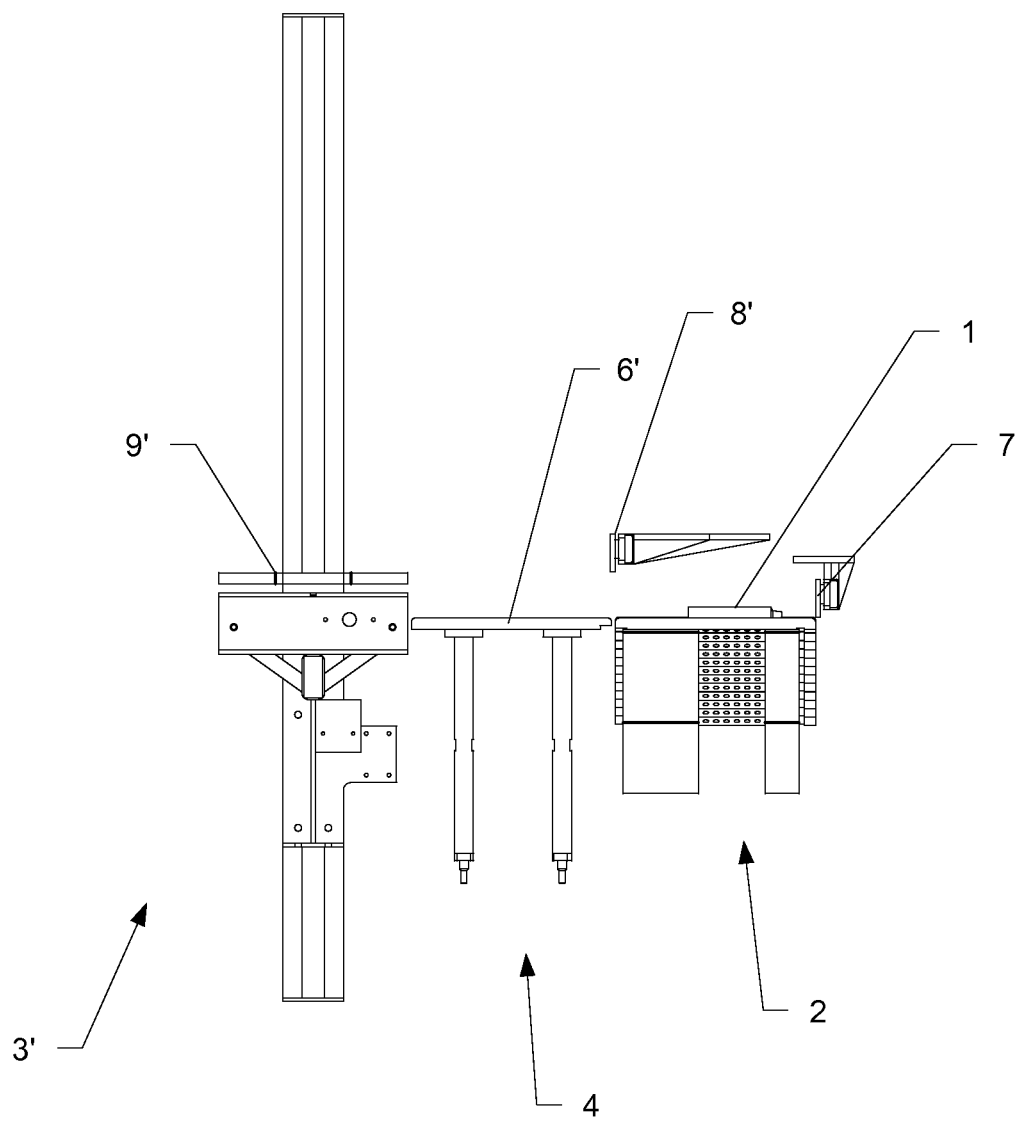
FIG. 2 shows a lateral view of the device of FIG. 1.
Figure 3:
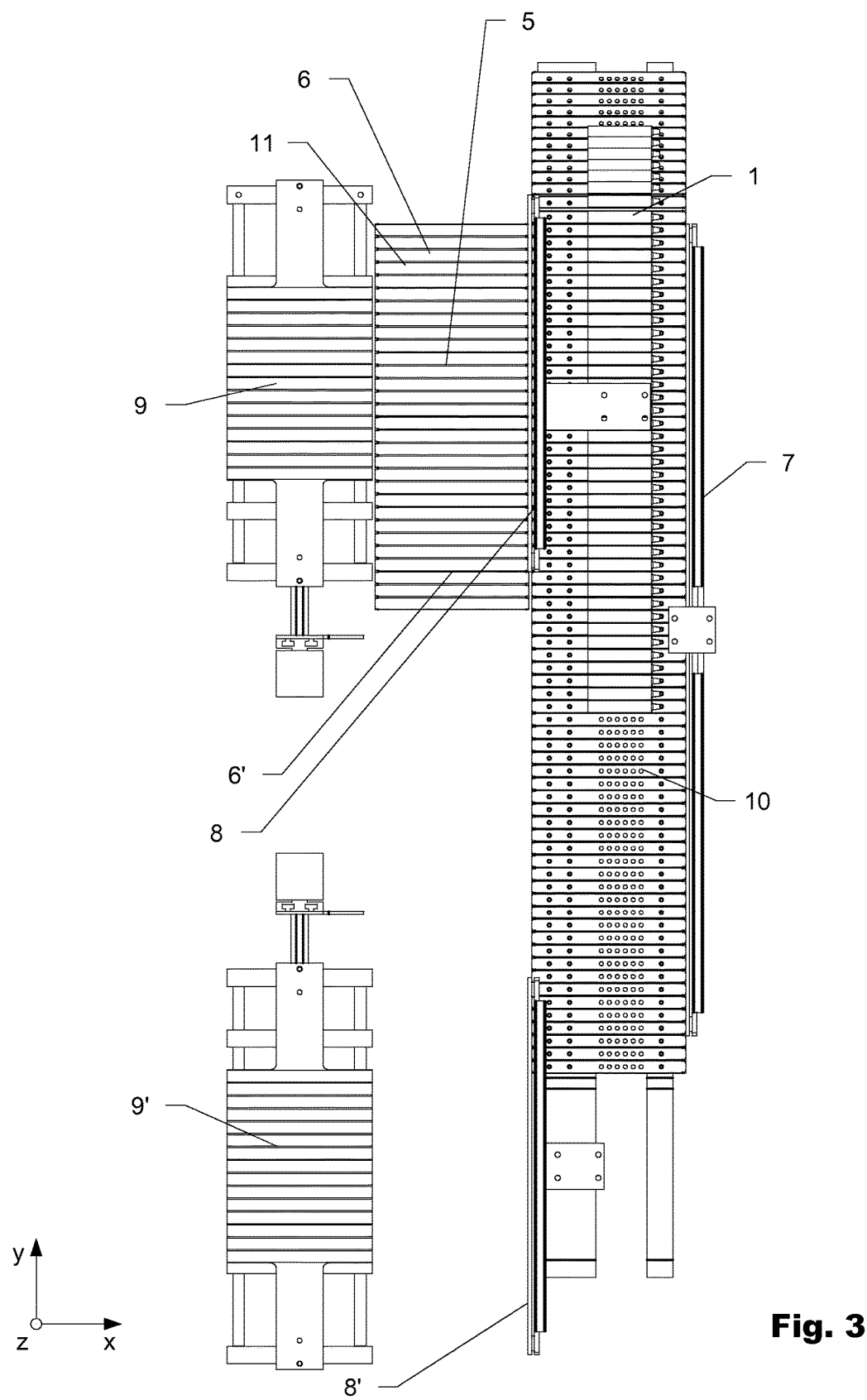
FIG. 3 shows a top view of the device of FIG. 1.

FIG. 1 shows a perspective view of an embodiment of the device for packaging tubes with a distribution unit, wherein for the sake of simplicity only the most important elements are shown. For example, the entire tube supply device and the actual packaging unit with the box and/or the mandrel plate as well as the mechanics and bearing arrangement of the conveyor belt and of the sliders are not shown. FIG. 2 and FIG. 3 show a lateral view and a top view of the device of FIG. 1.

The device comprises a conveyor belt 2 for the continuous conveyance of tubes 1 arranged in product receiving devices 10. The figures show only some of the product receiving devices 10 distributed over the entire conveyor belt. By means of a separate tube supply device the tubes are placed into the product receiving devices without there being any gaps.

The fill state of the product receiving devices 10 of the conveyor belt 2 is to be interpreted as being indicative only in the drawing. The fill level continuously changes during operation.

The device further comprises a distribution device 4 with a distributor plate 5 arranged parallel to the conveyor belt 2 and spaced apart from it, wherein the distance is only a few millimetres. The distributor plate 5 also comprises product receiving devices 11. The distribution plate 5 is held and movable in such a manner that it is movable synchronously with the conveyor belt 2 in the direction of conveyance A so that the respective product receiving devices 10, 11 of the conveyor belt 2 and of the distributor plate 5 are aligned with each other when moving along a defined transfer path.

On the side of the conveyor belt 2, which side is arranged opposite the distributor plate 5, a slider 7 is arranged that is held or suspended in such a manner that it is movable synchronously with the distribution plate 5 and can also move along the transfer path. The length of the slider 7 corresponds at least to the length of the distributor plate 5 so that the aforesaid can slide a predetermined number of tubes 1, aligned beside each other, onto the distributor plate 5. To this effect the end of the slider 7, which end is opposite the direction of conveyance A, is essentially aligned with the edge of the distributor plate 5, which edge is opposite the direction of conveyance A. Furthermore, the slider 7 is movable in such a manner that it can slide the supplied tubes 1 across the direction of conveyance A from the conveyor belt 2 to the distributor plate 5.

The distributor plate can be divided into two distributor plate halves 6, 6' which can convey the tubes 1 to a first or a second grouping plate 9, 9' of the first or of the second grouping device 3, 3'. To this effect the two distributor plate halves 6, 6' are height-adjustable. Furthermore, above the conveyor belt 2 and above the slider 7 a first and a second distribution slider 8, 8' are arranged, which can slide the tubes 1 across the direction of conveyance A from the respective distributor plate halves 6, 6' to the respective grouping plates 9, 9'. The grouping plates 9, 9' also comprise product receiving devices. The grouping plates 9, 9' are vertically slidable along posts 12, 12' in order to convey the tubes 1 to a box or mandrel plate (not shown) where they are onwards conveyed or packaged in the conventional manner.

FIGS. 4(a) to 4(e) show steps of the method for packaging tubes 1 on the device of FIGS. 1 to 3. The tubes 1 are placed, by a tube supply device (not shown), without any gaps into product receiving devices 10 of the conveyor belt 2. As soon as a sufficient number of tubes 1 are in place on the conveyor belt 2, both the distributor plate 5 and the slider 7 (arrows B) move at the same speed as the conveyor belt 2 in the direction of conveyance A (FIG. 4(a)). The distributor plate 5 also comprises product receiving devices 11, which for the purpose of transfer of the tubes 1 are made to be in agreement with the product receiving devices 10 of the conveyor belt 2. The slider 7 is moved so as to be synchronous to the distributor plate so that during the transfer of the tubes 1 the rear end of the slider 7 is aligned with the rear end of the distributor plate 5. The foremost product receiving device 11, in the direction of conveyance A, of the distributor plate 5 is made to be in agreement with the product receiving device 10 of the foremost tube on the conveyor belt 2 so that no tube is lost.

Figure 4A:
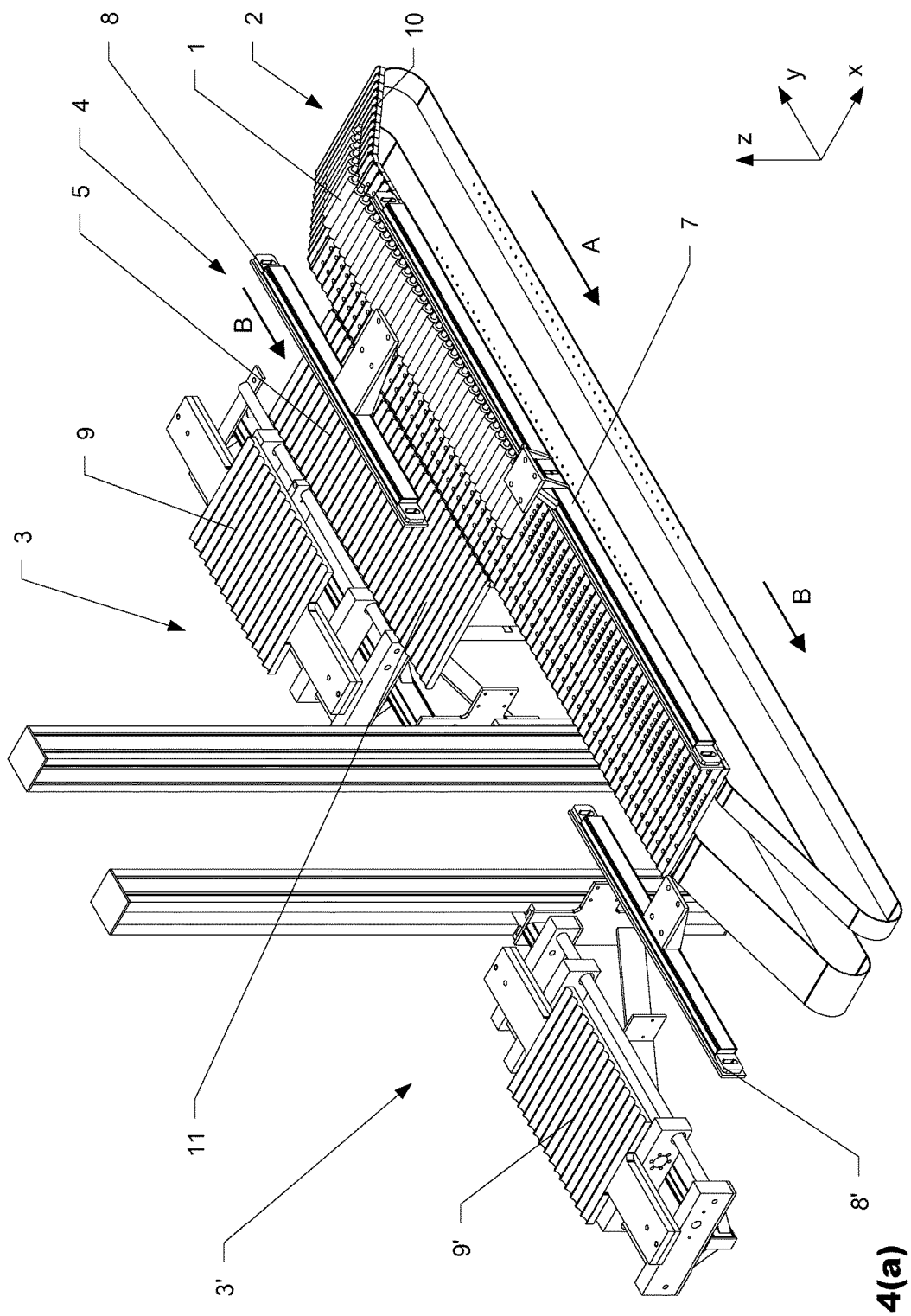
FIGS. 4(a)-(e) show the individual steps of a method for packaging tubes by means of a distribution device.
Figure 4B:
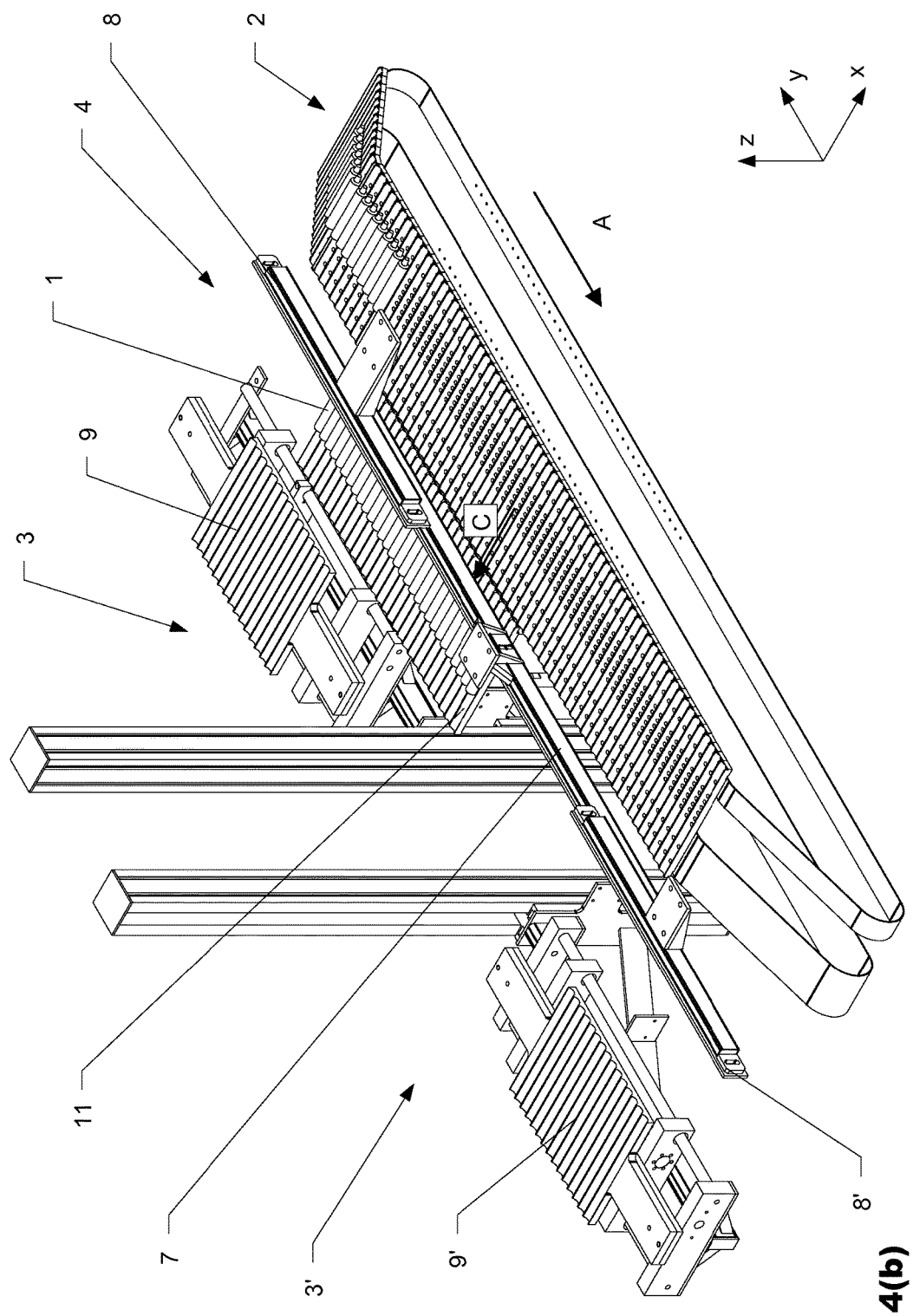

For the transfer of the tubes 1 to the distributor plate 5 the tubes 1 are slid, by means of a slider 7, across the direction of conveyance A from the conveyor belt 2 to the distributor plate 5 (arrows C) (FIG. 4(b)). The transfer can take place with the conveyor belt 2 running and with the distributor plate 5 and the slider 7 being moved synchronously while further tubes 1 are continuously placed onto the conveyor belt 2.

Figure 4C:
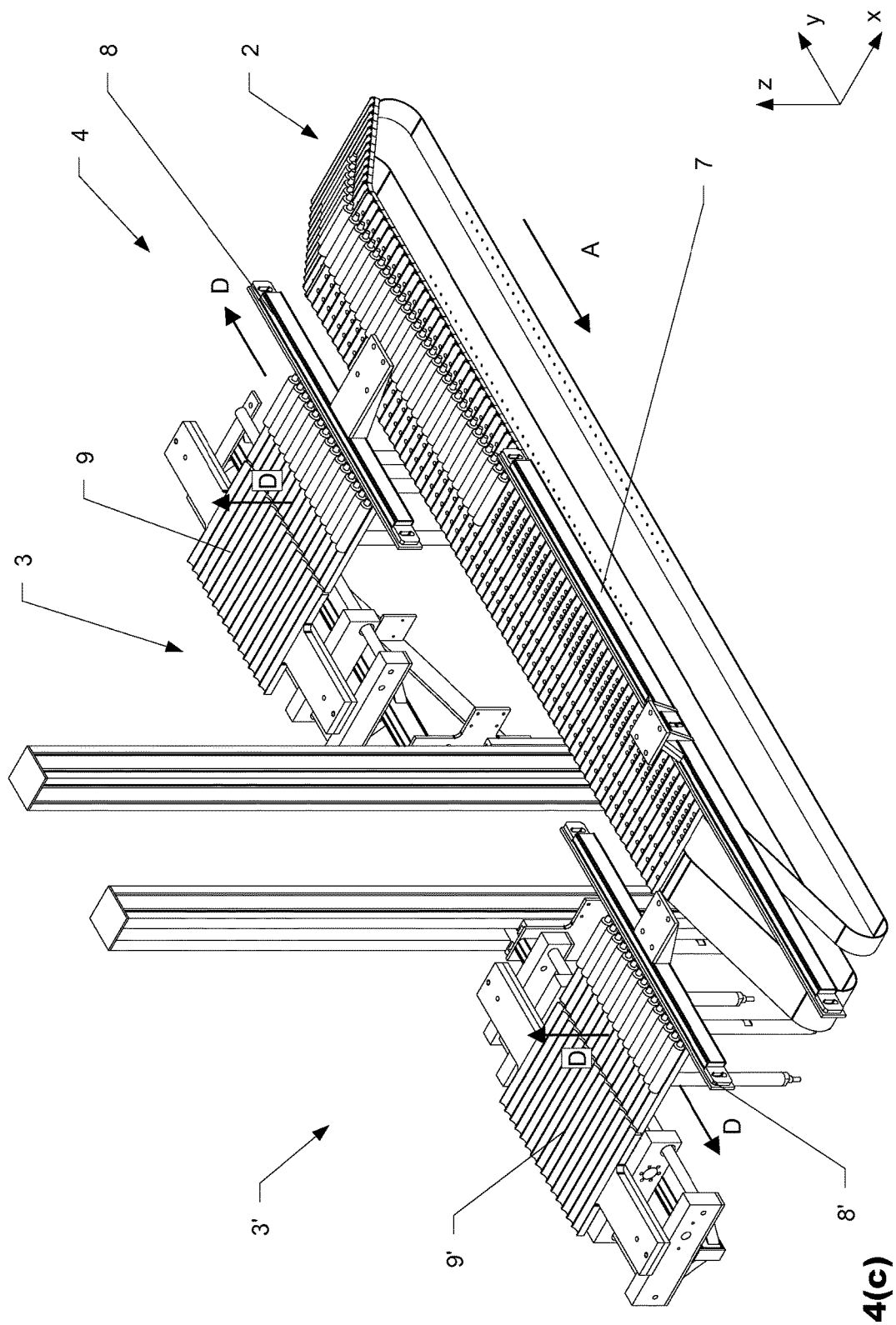

After completion of the transfer the distributor plate 5 is divided into two distributor plate halves 6, 6', each conveying half of the accepted tubes 1 to a first or to a second grouping device 3, 3' (arrows D) (FIG. 4(c)). In this design the two distribution plates 6, 6' move along or against the direction of conveyance A and upwards in order to make the product receiving devices 11 of the distributor plate halves 6, 6' be in agreement with product receiving devices of a first grouping plate 9 and of a second grouping plate 9' of the first or of the second grouping device 3, 3'.

Figure 4D:
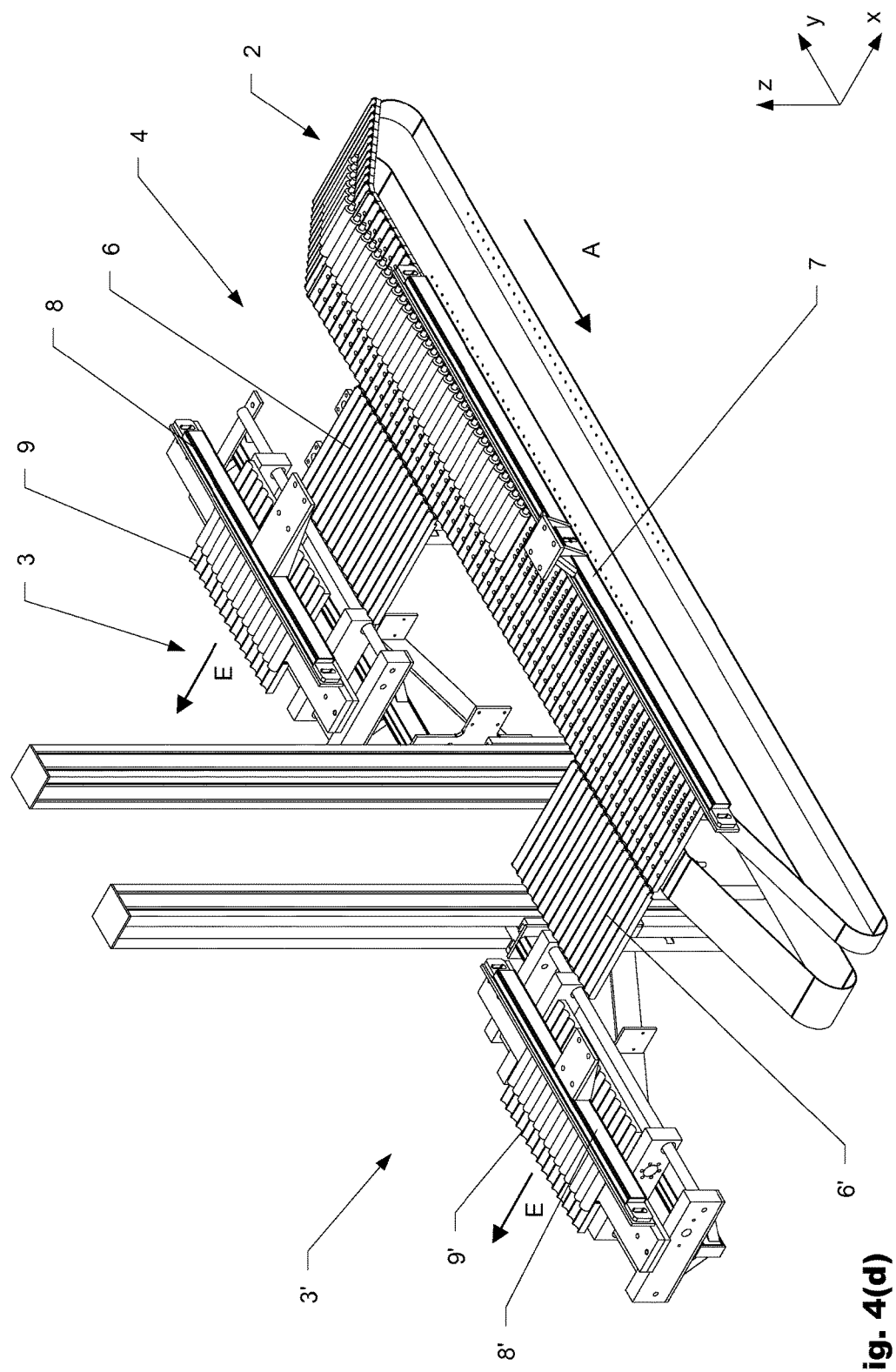
Figure 4E:
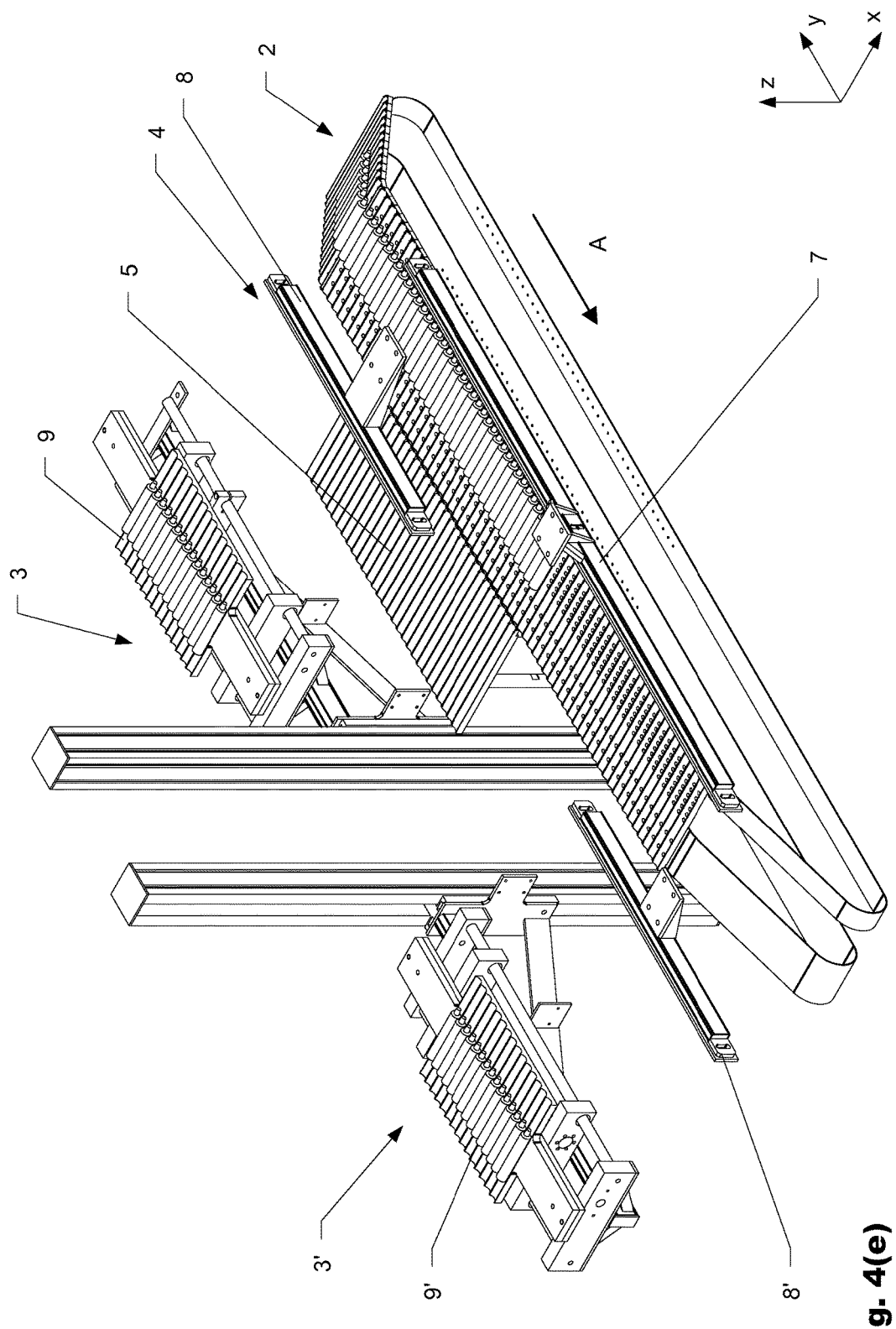

In this position by means of a first distribution slider 8 and a second distribution slider 8' the respective tubes 1 are slid onto the first or onto the second grouping plate 9, 9' (arrows E) (FIG. 4(d)). On completion of the transfer of the tubes to the two grouping plates 9, 9' the two distributor plate halves 6, 6' move back and combine for renewed acceptance of tubes 1 from the conveyor belt 2 to form the undivided distributor plate 5 (FIG. 4(*e*)). The grouping plates 9, 9' move, for example, upwards into a position in order to transfer the tubes 1 in a conventional manner layer by layer into a box or onto a mandrel plate (not shown).

REFERENCE LIST

1 Hollow cylindrical product units/tubes
2 Conveyor belt
3 First grouping device
3' Second grouping device
4 Distribution device
5 Distributor plate
6 First distributor plate half
6' Second distributor plate half
7 Slider
8 First distribution slider
8' Second distribution slider
9 Grouping plate
9' Grouping plate
10 Product receiving device
11 Product receiving device
12, 12' Post
A Direction of conveyance

The invention claimed is:

1. A device for supplying elongated, at least approximately hollow cylindrical, product units to packaging units, wherein the device comprises: (a) a conveyor belt for the continuous conveyance of several product units in a direction of conveyance, and (b) a distribution device for distributing the continuous stream of product units to two packaging units that operate in parallel, the distribution device comprising a two-part distributor plate for accommodating a selectable number of product units from the conveyor belt, the distributor plate being moveable parallel to the direction of conveyance of the conveyor belt and synchronously with the operating speed of the conveyor belt, wherein the distributor plate is dividable into two distributor plate halves that are movable in such a manner that they can convey half of the product units accommodated by the distributor plate to the respective packaging units, wherein the distribution device further comprises a slider that is moveable synchronously with the distributor plate in the direction of conveyance, and is arranged on the opposite side of the conveyor belt in relation to the distributor plate whereby the selectable number of product units is slid from the conveyor belt to the distributor plate by means of the slider.

2. The device according to claim 1, wherein the device comprises a first grouping device and a second grouping device as packaging units by means of which a selectable number of product units can be grouped to product groups that can be placed into a box; wherein the distributor plate conveys the accommodated product units to the first grouping device or to the second grouping device.

3. The device according to claim 1, wherein the device comprises a first distribution slider and a second distribution slider by means of which the product units arranged on the first or on the second distributor plate half are transferred to a first or to a second grouping plate of the first or of the second packaging unit or grouping device.

4. The device according to claim 3, wherein the first distribution slider and the second distribution slider are arranged above the conveyor belt.

5. The device according to claim 1, wherein the first distributor plate half and the second distributor plate half are movable upwards or downwards perpendicularly to the direction of conveyance of the conveyor belt.

6. The device according to claim 1, wherein the first grouping plate and the second grouping plate are movable upwards or downwards perpendicularly to the direction of conveyance of the conveyor belt and parallel to the direction of transport of the conveyor belt.

7. The device according to claim 1, wherein the two distributor plate halves are movable relative to each other in the direction of conveyance.

8. A method for supplying elongated, at least approximately hollow cylindrical, product units to packaging units in that a continuous stream of product units is distributed, by means of a distribution device, to two packaging units that operate in parallel, the method comprising: a) providing a continuous conveyance stream of several product units in a direction of conveyance on a conveyor belt; b) transferring a selectable number of product units from the conveyor belt to a distributor plate that is dividable into a first distributor plate half and a second distributor plate half wherein the distributor plate moves synchronously with the conveyor belt in the direction of conveyance, wherein a slider is used that moves in the direction of conveyance synchronously with the distributor plate whereby the selectable number of product units is slid from the conveyor belt to the distributor plate by means of the slider; c) dividing the distributor plate into the first and the second distributor plate halves, wherein each of the two distributor plate halves conveys half of the transferred product units to a first grouping device or to a second grouping device; d) transferring the product units from the two distributor plate halves to the grouping device; and e) returning the distributor plate halves for the renewed carrying out of the steps b) to d).

9. The method according to claim 8, wherein in step a) each product unit on the conveyor belt is placed in a respective product receiving device.

10. The method according to claim 8, wherein the transfer in step b) is carried out with the conveyor belt running.

11. The method according to claim 8, wherein during the transfer in step b) the foremost product receiving device, in direction of conveyance, of the distributor plate is in agreement with the product receiving device of the foremost product unit on the conveyor belt.

12. The method according to claim 8, wherein during step c), the two distributor plate halves are moved relative to each other in the direction of conveyance.

\* \* \* \* \*